United States Patent [19]

Bloom

[11] Patent Number: 4,663,666
[45] Date of Patent: May 5, 1987

[54] CAMERA OUTPUT DATA CORRECTION APPARATUS

[75] Inventor: Leslie E. Bloom, Ypsilanti, Mich.

[73] Assignee: VSP, Inc., Ann Arbor, Mich.

[21] Appl. No.: 694,075

[22] Filed: Jan. 23, 1985

[51] Int. Cl.4 .............................................. H04N 5/14
[52] U.S. Cl. ...................................... 358/166; 358/219
[58] Field of Search ................. 358/160, 166, 219, 222

[56] References Cited

U.S. PATENT DOCUMENTS

| 3,987,243 | 10/1976 | Schwartz | 358/166 |
| 4,217,641 | 8/1980 | Naparstek | 364/414 |
| 4,350,998 | 9/1982 | Verhoeven | 358/111 |
| 4,437,161 | 3/1984 | Anderson | 364/414 |
| 4,450,482 | 5/1984 | Ackerman | 358/160 |
| 4,450,483 | 5/1984 | Coviello | 358/166 |

Primary Examiner—Tommy P. Chin
Attorney, Agent, or Firm—Basile, Weintraub & Hanlon

[57] ABSTRACT

An apparatus for correcting camera output data for excessive voltage build up on the camera image tube target during active video scan and retrace time periods as well as d.c. restoration error. The apparatus includes an A/D converter which converts the raw analog camera video output into a plurality of digital data values during each active scan period. The digital values are stored in a memory or register. The voltage on the camera image tube target is sampled during the retrace period of the camera beam. The magnitudes of the voltages sampled during all or a portion of the retrace period are averaged to generate an average value corresponding to the excess voltage built up on the screen during the scan and retrace time periods plus the d.c. restoration error. The average value is then added or subtracted from the digital data signals generated during the active beam scan period to generate output data which has been adjusted for the d.c. errors during a single scan of the camera beam.

6 Claims, 3 Drawing Figures

CAMERA OUTPUT DATA CORRECTION APPARATUS

BACKGROUND OF THE INVENTION

1. Field of the Invention

This invention relates, in general, to camera imaging apparatus and, more specifically, to data processing apparatus for camera imaging devices.

2. Description of the Prior Art

In the operation of an image tube based camera, the sweep beam of the camera makes a plurality of vertically spaced, substantially horizontal sweeps across the image tube target of the camera. Typically, for example, the beam makes from $262\frac{1}{2}$ to over 1000 horizontal sweeps across the image tube target before returning to the top of the target and repeating the scanning operation. A current is generated when the beam strikes the target which is amplified to generate a raw camera analog video signal data suitable for subsequent processing or display.

The sweep of the camera beam is divided into a scan period, i.e., a rapid left to right movement of the beam across the face of the image tube during which the beam also moves vertically downward at a slower rate, and a blank or retrace period during which the beam moves from right to left. During the retrace periods, the raw analog video output of the camera is normally blanked and frequently synchronization pulses (sync tips) are added to the video signal to indicate the start of the retrace period to external devices, such as monitors or data processors.

Due to the inherent design of a camera, a voltage or charge builds up on the image tube target during the scan and retrace periods which causes the raw analog output voltage to be offset or different from the original detected voltage by a d.c. error voltage. This introduces error into the raw camera analog video signal. Such errors result from leakage camera tube current over varying temperature ranges as well as a.c. coupling between various stages of the camera circuitry. Another source of the d.c. error results from the analog d.c. restore circuit which is commonly used to make the voltage at the camera output zero at the end of each scan. However, the d.c. restore circuit includes an R-C network which inherently introduces a time constant in reducing camera output voltage to zero. Thus, the camera output voltage never actually reaches zero but is brought to approximately zero over a certain time period. During this time period, the camera output remains at an error voltage and is not true zero.

In order to overcome these problems, it would be desirable to provide a camera data processing apparatus which overcomes the problems of previously devised cameras with regard to the excess charge build-up on the camera image tube target during scan and retrace periods as well as d.c. restoration errors. It would also be desirable to provide a camera processing apparatus which adjusts the raw camera analog video data to compensate for these errors on a scan line by scan line basis.

SUMMARY OF THE INVENTION

The present invention is a camera output data correction apparatus which adjusts raw camera analog video output data for excess line and d.c. restoration errors charge built up during a single scan. The apparatus includes a means for converting the raw analog camera video output after d.c. restoration to a plurality of discrete digital values during the active scan time of the camera beam. The digitized data signals are then stored in a suitable data storage means.

Means are provided for sampling the amplified d.c. restored voltage during the retrace time period of the camera beam. Means are also provided for averaging the voltages sampled during the retrace period to generate an average value of excess voltage build up. Finally, the present invention includes means for adjusting the digitized data generated during the scan time of the beam with the average value of the error voltage sampled during the retrace period, when there is no valid active video information to correct the digitized data for the induced d.c. errors.

In a preferred embodiment, an A/D converter is connected to the camera output for converting the raw, amplified, d.c. restored analog camera output signal into digital values. The digital data is then fed to a FIFO register which sequences such data in the register through a first in—first out basis during the active video scan time of the camera.

During the horizontal retrace or horizontal video blanking time period, the camera output voltage is again sampled and the sampled voltages are input to an adder which totalizes the voltages during the retrace time period. The totalized retrace voltages are divided by the number of samples during the retrace time period to generate the average value of the d.c. voltage error generated during one active scan period. The average error value is input as an address into a memory along with the sequential output from the FIFO register during the next active scan time period of the camera.

The memory includes a plurality of addressable memory locations which store data corresponding in value to the anticipated digitized data from the camera. However, the stored data has been adjusted by the anticipated average values, such as plus or minus one, two, three, etc., to thereby output from the memory data which has been corrected for the average value of the d.c. error during the preceding scan time. This data closely approximates the original data generated by the camera thereby overcoming problems existent with previously devised camera apparatus which have not successfully dealt with the excess charge or voltage built up during scan and retrace time periods, as well as induced d.c. restoration errors.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 2:
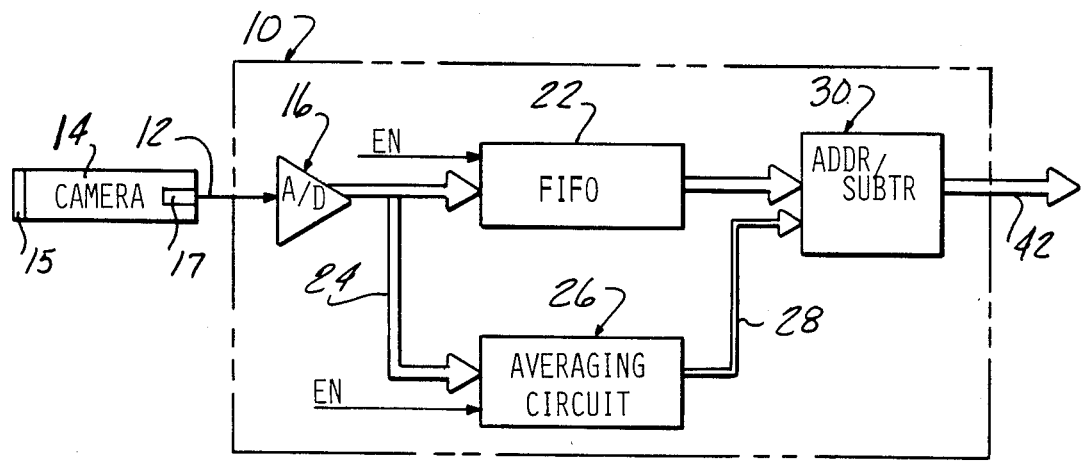
FIG. 2 is a block diagram showing the camera output data correction apparatus of the present invention.

Throughout the following description and drawing, an identical reference number is used to refer to the same component shown in multiple figures of the drawing.

The present invention is a camera output data correction apparatus which corrects raw camera analog video output data for excess voltage or charge build up on the camera image tube target and induced d.c. restoration errors during each scan and retrace period of the camera beam.

1. Background

For a clearer understanding of the present invention, a brief description of the operation of a typical camera will be initially presented before describing the features of the present invention.

In operation, an image tube based camera includes a beam which sweeps across an image tube target a number of times per frame. Typically, the beam makes from 262½ to over 1000 substantially horizontal passes or scans of the image tube target across the entire vertical length of the target before returning to the upper portion of the target. The camera beam sweep is divided into two sections, one being the active video sweep along a horizontal scan line and the second being a retrace or blanking period during which the beam retraces from one end of one scan line to the opposite end of the next scan line and during which the camera analog video output is blanked.

A problem inherent in such camera operation is that excess voltage or charge builds up on the image tube target during the normal operation of the camera. Since the camera analog video output is solely dependent upon the current measured on the target along each scan line and during each retrace period, such excess charge has lead to errors in the raw camera analog video output data which result in gray scale distortion in the resulting image from the camera. An additional d.c. voltage error is induced by use of the conventional d.c. restore circuits which attempt to return the camera output voltage to zero at the end of each active scan line. This voltage results from a.c. coupling in the video amplifier as well as the inherent capacitance in the d.c. restore circuit such that the camera analog output voltage never actually reaches zero thereby introducing further error into subsequent camera analog video output signals.

The present invention is a camera output data correction apparatus which corrects the raw camera analog video output and d.c. restoration errors for such excess charge build up thereby presenting data from a camera which more closely approximates the actual data or image viewed by the camera.

2. Implementation

As shown in FIG. 2, the present data correction apparatus 10 receives raw camera analog video signals on a conductor 12 from a conventional camera 14 a camera image tube target 15 and a sampling means or scan beam 17. The raw camera analog video signals on conductor 12 are fed to a means 16 for converting the analog signals to a plurality of digitized or digital signals. Preferably, the converting means 16 comprises a conventional A/D converter which samples the analog video signal at a pre-determined sampling rate.

Figure 1:
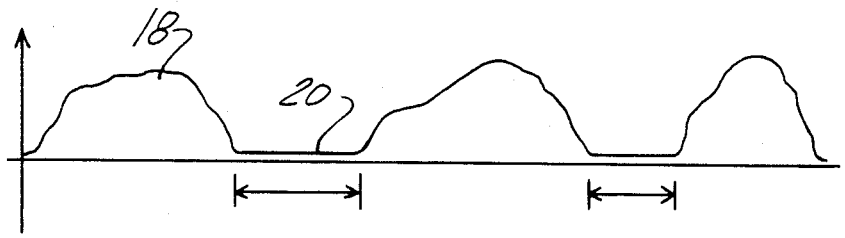
FIG. 1 is a wave form diagram illustrating a typical output from a camera showing the voltage measured on the camera screen during successive scan and retrace time periods.

As shown in FIG. 1, the raw camera video signal includes a series of amplified, d.c. restored, voltage signals 18 during one active scan of the beam across the camera image tube target which were input to the A/D converter 16 which digitizes such voltages to a plurality of digital signals in direct proportion to the magnitude of the voltage on the camera target at each sample point. For example, during a typical sweep of the camera beam across the target, the A/D converter 16 would generate 512 digital signals corresponding to 512 sampled points along the analog signal 18 shown in FIG. 1. The digitized data may be presented in any bit length, with 8 bits being utilized in a preferred embodiment of the present invention.

At the end of each scan line, the camera beam retraces to the next vertically spaced scan line during a so-called "retrace or blanking" period as indicated by reference number 20 in FIG. 1.

In the present invention, the digitized scan line data is input to a storage means 22, shown in FIG. 2, which temporarily stores the data in a sequential manner.

During the retrace period 20, the raw camera analog video signal is again sampled by the A/D converter 16, although most likely at a lesser number of samples, such as 64 samples as compared to the 512 samples during each active video scan period. The sampling during the retrace period may be equally spaced across the entire retrace period or may be done only in the beginning of the retrace period depending on the desired correction capability. The digital data during the retrace period is input via data bus 24 to an averaging means 26. The averaging means 26 functions to average the magnitude of the voltages sampled during the retrace period and generates an output on data bus 28 corresponding to the average value of the d.c. error built up during a single scan period.

The present camera output data correction apparatus 10 also includes means 30 for adjusting the digitized camera output data with the average value generated by the averaging means 26 to generate output data which more closely approximates the actual image viewed by the camera 14.

Figure 3:
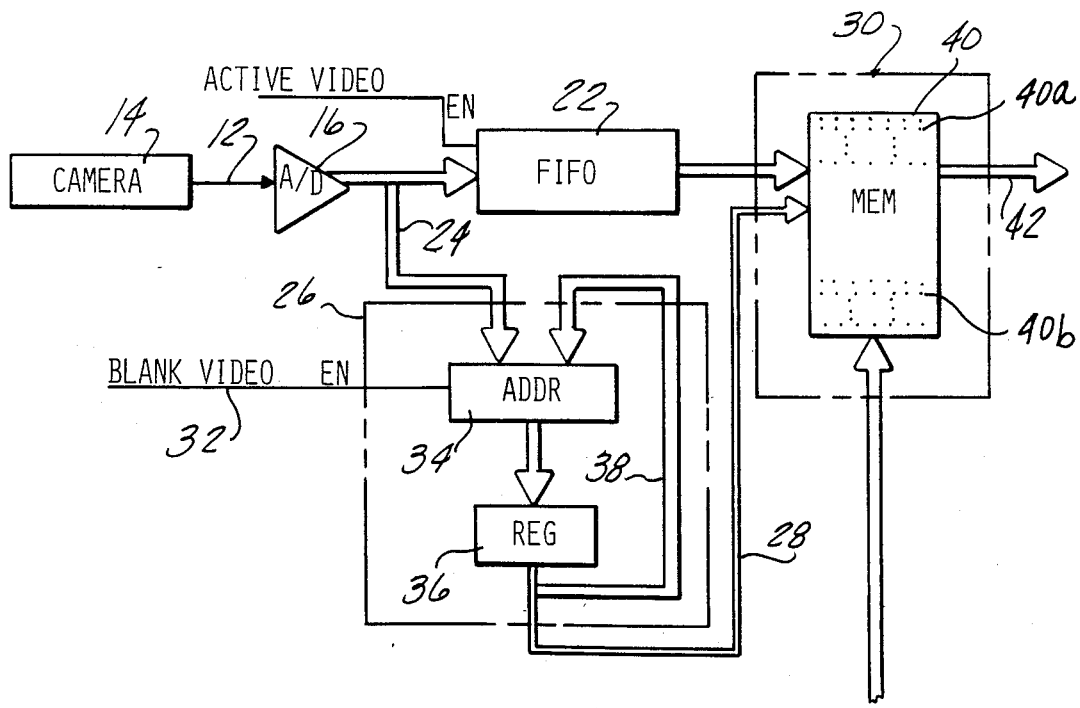
FIG. 3 is a detailed block diagram showing a preferred embodiment of the camera output data correction apparatus of the present invention.

In a preferred embodiment of the present invention, as shown in FIG. 3, the output of the A/D converter 16 is input to a storage means 22 which is preferably formed of a FIFO register in which the data is sequenced through the register in a first in—first out basis. The FIFO register 22 also has as an input an active video enable signal from the camera 14 such that data is stored in the FIFO register 22 only during the active video scan time of the beam of the camera 14.

The FIFO register 22 may be conventionally formed and, in a preferred embodiment, includes storage for 512 samples of 8 bit data from the A/D converter 16. It will be understood, however, that other memory configurations and devices dependent upon the form of the digitized output data from the A/D converter 16 may also be employed in the present invention.

During the retrace period, the camera 14 generates a blank video enable signal 32 which is input to the averaging means 26. Specifically, the blank video enable signal 32 is input to an adder 34 to activate the adder 34. The adder 34 receives as inputs the output of the A/D converter 16 on data bus 24 and the output from a register 36 on data bus 38. The adder 34 sums both digital values and outputs the total to the register 36. This effectively totalizes the output values from the A/D converter 16 during the camera retrace period 20.

The output from the register 36 is input as an address to the means 30 for adjusting the magnitude of value of the digitized data in the FIFO register 22. Another portion of the address to the memory 40 is formed by the output from the FIFO register 22 representing the digitized data sampled by the A/D converter 16 during the active camera scan time.

The memory 40 may be any conventional type of memory, such as a random access memory (RAM), which includes a plurality of addressable memory locations 41 storing data representations in binary form of digitized camera data and which, when addressed, can be output such data on output data bus 42 to a suitable display or further processing equipment, not shown.

As is conventional, selecting only certain output lines for the register 36 effectively makes the register 36 a divider which divides the total value stored in the adder 34 by a pre-determined number.

Thus, for example, if 64 samples are taken during the retrace period such that 64 values are totalized in the adder 34, dropping the lowermost six bits from the output of the register 36 effectively divides the total in the adder 34 by 64 and generates an average value of the totalized data corresponding to the voltages measured by the camera during the retrace period.

The memory 40, in a preferred embodiment, has its memory locations divided into a plurality of separate groups 40a and 40b, each of which is selectively addressable by the average value from the register 36 on data bus 28. By way of explanation, the addressable locations in the memory 40 are divided into a series of groups 40a and 40b, etc., each corresponding to a particular anticipated numeric average value from the register 36. Such numeric values can range, typically, from plus or minus 1, 2, 3, etc.

Within each group of addressable locations, data is stored in sequential memory locations corresponding to anticipated digital data from the register 22 which have been adjusted for the corresponding average value. Thus, for example, if a digital data value of 256 is anticipated from the FIFO register 22, the data values stored in the appropriate location in the first group of memory locations in the memory 40 would be 255 for an average d.c. error value of plus 1. The corresponding data stored in the second group of memory locations for an average error value of plus 2 would be 254. In this manner, the data output from the memory 40 on data bus 42 is corrected or adjusted by the average value generated from the averaging circuit 26 for the d.c. voltage error built up on the camera screen during a single active video scan period. This results in output data which more accurately approximates the original image viewed by the camera.

In operation, during one scan cycle, the A/D converter 16 digitizes a plurality of data points corresponding to the voltage of the camera target as shown by the analog waveform 18 in FIG. 1. These digitized data signals are input in a sequential manner into the FIFO register 22. During the retrace period, the voltage on the camera target is again sampled and the measured values are input to the averaging means 26 which generates an average value corresponding to the d.c. error voltage during the active scan of the camera beam. The average value is input to a memory having pre-stored data values along with the sequential output from the FIFO register 22 during the next active video scan period thereby outputting from the memory 40 sequential data values representing the sampled data during the prior scan period which had been adjusted by the average of the d.c. error during the prior scan.

The camera output data correction apparatus of the present invention overcomes many of the problems of previously devised camera apparatus which have attempted to correct or compensate for the excess voltage build up on a camera target during active scan times as well as d.c. restoration errors. The apparatus of the present invention is inexpensive to implement and provides output data which more closely approximates the image viewed by the camera.

What is claimed is:

1. A camera output data correction apparatus for use with a camera having a sweep beam making a plurality of scans of a camera image tube target interspersed with retrace scans to the next vertically spaced scan line and generating a raw analog video output signal comprising:

means for converting the raw analog video output signal from the camera into a plurality of discrete digital values during each active video scan of the camera sweep beam and during each retrace of the camera sweep beam;

means, responsive to the converting means, for storing the discrete digital values generated during each active video scan of the camera sweep beam;

means, responsive to the converting means, for averaging the discrete digital values during retrace and generating an average value corresponding to the average of the magnitude of the sampled discrete digital retrace values; and means for adjusting the stored digital data generated during each active video scan with the average value to generate second data values varied by the average value.

2. The apparatus of claim 1 wherein the converting means comprises an A/D converter.

3. The apparatus of claim 1 wherein the storing means comprising a memory means for storing data on a first in—first out basis.

4. The apparatus of claim 1 wherein the averaging means comprises:

adder means for totalizing the discrete digital values generated during retrace; and means for dividing the totalized discrete digital values by the number of samples during retrace to obtain the average value of the discrete digital values during retrace.

5. The apparatus of claim 4 wherein the adjusting means comprises:

memory means having a plurality of addressable memory locations storing data arranged in a plurality of sections corresponding to anticipated values corrected by the average value generated during retrace;

the average value acting as an address along with the stored digital values generated during each active video scan to the memory means for selecting a particular address location in the memory means to generate an output from the memory means corresponding to a value adjusted from the stored discrete digital value generated during the active video by the average value generated during retrace.

6. A camera output data correction apparatus use with a camera having a sweep beam making a plurality of active video scans of a camera image tube target interspersed with retrace scans to the vertically spaced scan line and generating a raw analog video output signal comprising:

an analog/digital converter for converting the raw analog video output signal from the camera into a plurality of discrete digital signals during each active video scan of the camera sweep beam signals;

temporary data storage means for storing the discrete digital signals generated during each active video scan on a first in—first out basis;

the analog/digital converter sampling the raw analog video output of the camera during retrace and generating a plurality of retrace digital signals;

adder means for totalizing the retrace digital signals during retrace;

means for dividing the retrace digital signals by the number of sampled retrace digital signals during retrace to obtain the average value of the retrace digital signals; and memory means having a plurality of addressable memory locations storing data arranged in a plurality of sections corresponding to anticipated values corrected by the average value generated during retrace;

the average value acting as an address along with the digital values during the active video scan time to the memory means for selecting a particular section of address locations corresponding to each distinct average value and a particular address location in each particular section to generate an output corresponding to a data value adjusted from the discrete digital signals generated during the active beam scan time by the average value generated during retrace.

* * * * *